(12) United States Patent
Uehata

(10) Patent No.: US 8,041,980 B2
(45) Date of Patent: Oct. 18, 2011

(54) TIME CERTIFYING SERVER, REFERENCE TIME DISTRIBUTING SERVER, TIME CERTIFYING METHOD, REFERENCE TIME DISTRIBUTING METHOD, TIME CERTIFYING PROGRAM, AND COMMUNICATION PROTOCOL PROGRAM

(75) Inventor: Masakazu Uehata, Chiba (JP)

(73) Assignee: Seiko Instruments Inc. (JP)

( * ) Notice: Subject to any disclaimer, the term of this patent is extended or adjusted under 35 U.S.C. 154(b) by 907 days.

(21) Appl. No.: 11/918,144

(22) PCT Filed: Apr. 7, 2006

(86) PCT No.: PCT/JP2006/307451
§ 371 (c)(1),
(2), (4) Date: Oct. 10, 2007

(87) PCT Pub. No.: WO2006/109723
PCT Pub. Date: Oct. 19, 2006

(65) Prior Publication Data
US 2008/0307247 A1 Dec. 11, 2008

(30) Foreign Application Priority Data
Apr. 11, 2005 (JP) ................................. 2005-113380

(51) Int. Cl.
*G06F 1/04* (2006.01)
(52) U.S. Cl. ..................................................... 713/500
(58) Field of Classification Search ............ 13/500; 713/500
See application file for complete search history.

(56) References Cited

U.S. PATENT DOCUMENTS
7,174,392 B2 * 2/2007 Tervo ............................ 709/248
7,194,556 B2 * 3/2007 Rajagopal et al. ............. 709/248

FOREIGN PATENT DOCUMENTS
| JP | 04230890 | 8/1992 |
| JP | 10028119 | 1/1998 |
| JP | 2002216420 | 8/2002 |
| JP | 2002229869 | 8/2002 |
| JP | 2003098280 | 4/2003 |
| JP | 2004046756 | 2/2004 |
| JP | 2004194306 | 7/2004 |

* cited by examiner

*Primary Examiner* — Thomas Lee
*Assistant Examiner* — Eric Chang
(74) *Attorney, Agent, or Firm* — Adams & Wilks

(57) ABSTRACT

A time certifying server has a clock unit that outputs time information. Units of time equal to or larger than a predetermined unit are acquired from the time information. Units of time from the time information smaller than the predetermined unit are corrected using an acquired correction time and without correcting the acquired units of time equal to or larger than the predetermined unit. A reference time is received from a reference time distributing server that distributes reference time. A verification process is then executed to verify that the clock unit operates at a precision falling within a predetermined range by confirming that, in the time of the units equal to or larger than the predetermined unit, the acquired time and the received reference time coincide with each other. A certification target information that serves as time certification target is received from a client terminal. Time certification information of the received certification target information is generated after verification of the operational precision of the clock unit using the corrected units of time. The generated time certification information is transmitted to the client terminal.

9 Claims, 12 Drawing Sheets

(a)

(b)

PRIOR ART

US 8,041,980 B2

TIME CERTIFYING SERVER, REFERENCE TIME DISTRIBUTING SERVER, TIME CERTIFYING METHOD, REFERENCE TIME DISTRIBUTING METHOD, TIME CERTIFYING PROGRAM, AND COMMUNICATION PROTOCOL PROGRAM

CROSS-REFERENCE TO RELATED APPLICATIONS

This application is a U.S. national stage application of International Application No. PCT/JP2006/307451, filed Apr. 7, 2006, claiming a priority date of Apr. 11, 2005, and published in a non-English language.

BACKGROUND OF THE INVENTION

1. Technical Field

The present invention relates to a time certifying server, a reference time distributing server, a time certifying method, a reference time distributing method, a time certifying program, and communication protocol program, each relating to, for example, issuance of a time stamp for an electronic document.

2. Background Art

With the rapid development of information technology in recent years, so-called "paperless office policy" has been promoted, under which official or private documents are prepared each in the form of an electric document, obtained by digitizing its original document.

Also, in order to improve legal status given to such electronic documents, the electronic document law is about to be enforced.

In such electronic documents as prepared and stored in the above-mentioned way, what is important is time certification (date certification), such as certification of an issue date, for which a time stamp system for performing time certification is used.

FIG. 13 is a block diagram explaining a system configuration of a conventional time stamp system.

A time stamp system 100 includes a time distributing server 101 provided in a time distributing office, a time stamp server 102 provided in a time certification office, and client terminals 103, 103, etc.

The time stamp server 102 is a server which issues a time stamp, and each of the client terminals 103 is a terminal unit which receives a time stamp thus issued. A procedure of issuing a time stamp is as follows:

The client terminal 103 transmits a hash value of an electronic document, which is a target of time certification, to the time stamp server 102.

The time stamp server 102 receives a hash value from the client terminal 103, generates an electronic signature with respect to a time output from an internal clock installed therein and the hash value thus received, and transmits this as a time stamp to the client terminal unit 103.

The time distributing server 101 is a server which manages and distributes a time, which serves as a reference for a time used in the time stamp system 100. The time distributing server 101 has, for example, an atomic clock for measuring a reference time, and distributes a reference time, output from the atomic clock, to the time stamp server 102.

The time stamp server 102 receives a reference time from the time distributing server 101, and adjusts the internal clock by using this reference time.

In order to prevent doctoring of the reference time and time delay in a communication path, encryption is applied to the communication path provided between the time stamp server 102 and the time distribution server 101 by using a technique such as Secure Socket Layer (SSL), and Network Time Protocol (NTP) is used as a communication protocol. Note that the NTP is a protocol which is standardized for time distribution, and can correct time delay caused in the communication path.

Note that FIG. 13 shows only one time stamp server 102, but a configuration may be adopted in which a plurality of time stamp servers 102 are connected to the time distributing server 101.

As a technique of configuring such a time stamp system, there is the following system and method of providing a reliable third party clock and a reliable local clock.

Patent Document 1: Published Japanese Translation of PCT application 2003-519417

In this technique, a master clock system is provided as the time distributing server 101, and a local clock system is provided as the time stamp server 102, wherein the master clock system checks the local clock system, or performs other operations.

With this configuration, the master clock system (time distributing server 101) distributes a reference time to the local clock system (time stamp server 102), and further audits whether or not a time is doctored in the local clock system.

SUMMARY OF THE INVENTION

In the conventional time stamp system 100, in the communication between the time distributing server 101 and the time stamp server 102, for example, NTP or Public Key Infrastructure (PKI) is used so as to secure high precision and high reliability.

Further, to secure security of these systems, a tamper resistant device (a device which secures safety) is implemented, and the tamper resistant apparatus is endowed with these communication functions.

Generally speaking, information processing capability of such a tamper resistant device is limited, and also it is difficult that the device perform therein operations of a complicated system.

Accordingly, when these functions are intended to be realized in such a tamper device, implementation thereof becomes so complicated as to make the cost high.

Accordingly, an object of the present invention is to perform time certification at a low cost while keeping high precision and high reliability.

In order to achieve the above-mentioned object, the present invention provides a time certifying server comprising:

a clock unit for outputting a time;

first time acquiring means for acquiring a time of the units equal to or larger than a predetermined unit from a time output from the clock unit;

reference time receiving means for receiving a reference time from a reference time distributing server for distributing reference time;

verification means for verifying that the clock unit operates at a precision falling within a predetermined range by confirming that, in the time of the units equal to or larger than the predetermined unit, the time acquired by the first time acquiring means and the reference time thus received coincide with each other;

certification target information receiving means for receiving certification target information that serves as time certification target from a client terminal;

time certification information generating means for generating time certification information of the certification target information thus received by using the time output from the clock unit, the precision thereof being thus verified; and time certification information transmitting means for transmitting the time certification information thus generated to the client terminal (first configuration).

In the first configuration, a configuration may be adopted in which the verification means verifies that the clock unit operates at a precision falling within the predetermined range when it is confirmed that the reference time used for the verification is a time later than the time used at the previous verification (second configuration).

In any of the first and second configurations, a configuration may be adopted in which there are further provided:

correction time acquiring means for acquiring a correction time from a correction time generating unit; and time correcting means for correcting a time of units smaller than the predetermined unit from the time measured by the clock unit by using the correction time thus acquired, wherein the time certification information generating means generates the time certification information by using the time thus constructed (third configuration).

In any one of the first, second, and third configurations, a configuration may be adopted in which there is further provided predetermined unit changing means for changing the predetermined unit (fourth configuration).

In the fourth configuration, a configuration may be adopted in which the predetermined unit changing means sets the predetermined unit to a first unit, and sets the predetermined unit to a second unit, which is smaller than the first unit, when the verification means verifies a precision of the clock unit by using the first unit (fifth configuration).

In the third configuration, a configuration may be adopted in which there is further provided operational mode switching means for switching between a first operational mode in which the verification means and the time certification information generating means operate and a second operational mode in which the time correction means operates, wherein the operational mode switching means switches the operational mode after an operation is completed in each of the operational modes (sixth configuration).

In the sixth configuration, a configuration may be adopted in which the first operational mode includes a verification mode in which the verification means verifies the clock unit, and a time certification information generating mode in which the time certification information generating means generates the time certification information, and the operational mode switching means switches, in the switching between the verification mode and the time certification information generating mean, the operational mode to the mode switching destination after the operation in the mode switching source is completed (seventh configuration).

Further, the present invention provides a reference time distributing server for transmitting a time to the time certifying server according to claim 1, the reference time distributing server comprising:

a reference clock unit for outputting a reference time;

delay time measuring means for measuring delay time in a communication line connected to the time certifying server;

reference time generating means for generating a reference time obtained by setting forward the reference time output from the reference clock unit by the delay time thus measured; and reference time transmitting means for transmitting the reference time thus generated to the time certifying server (eighth configuration).

In the eighth configuration, a configuration may be adopted in which there are further provided time receiving means for receiving, from the time certifying server, a time output from the clock unit installed in the time certifying server, wherein the delay time measuring means measures the delay time by using a difference between the time thus received and the time output from the reference clock unit when the reception is executed (ninth configuration).

Also, the present invention provides a time certifying method executed in a computer having a clock unit for outputting a time, the computer including first time acquiring means, reference time receiving means, verification means, certification target information receiving means, time certification information generating means, and time certification information transmitting means, the method comprising:

a first time acquiring step of acquiring, by means of the first time acquiring means, a time of the units equal to or larger than a predetermined unit from a time output from the clock unit;

a reference time receiving step of receiving, by means of the reference time receiving means, a time that serves as a reference from the reference time distributing server for distributing a reference time;

a verification step of verifying, by means of the verifying means, that the clock unit operates at a precision falling within a predetermined range by confirming that, in the time of the units equal to or larger than the predetermined unit, the time acquired by the first time acquiring means and the reference time thus received coincide with each other;

a certification target information receiving step of receiving, by means of the certification target information receiving means, certification target information that serves as a time certification target from a client terminal;

a time certification information generating step of generating, by means of the time certification information generating means, time certification information of the certification target information thus received by using the time output from the clock unit, the precision thereof being thus verified; and a time certification information transmitting step of transmitting, by means of the time certification information transmitting means, the time certification information thus generated to a client terminal (tenth configuration).

In the tenth configuration, a configuration may be adopted in which the computer further includes a predetermined unit changing means, the method further comprising:

a predetermined unit changing step of setting, by means of the predetermined unit changing means, the predetermined unit to a first unit, and setting the predetermined unit to a second unit, which is smaller than the first unit, when a precision of the clock unit is verified by using the first unit at the verification step (eleventh configuration).

Further, the present invention provides a reference time distributing method executed in a computer which includes a reference clock unit for outputting a reference time and transmits a time to a time certifying server, the computer including delay time measuring means, reference time generating means, and reference time transmitting means, the method including:

a delay time measuring step of measuring, by means of the delay time measuring means, a delay time in a communication line connected to the time certifying server;

a reference time generating step of generating, by means of the reference time generating means, a reference time by setting forward the reference time output from the reference clock unit by the delay time thus measured; and a reference time transmitting step of transmitting, by means of the reference time transmitting means, the reference time thus generated to the time certifying server (twelfth configuration).

Further, the present invention provides a time certification program which, in a computer, realizes:

a first time acquiring function of acquiring a time of the units equal to or larger than a predetermined unit from a time output from a clock unit for outputting a time;

a reference time receiving function of receiving a time that serves as a reference from a reference time distributing server for distributing a reference time;

a verification function of verifying that the clock unit operates at a precision falling within a predetermined range by confirming that, in the time of the units equal to or larger than the predetermined unit, the time acquired by the first time acquiring means and the reference time thus received coincide with each other;

a certification target information receiving function of receiving certification target information that serves as a time certification target from a client terminal;

a time certification information generating function of generating time certification information of the certification target information thus received by using a time output form the clock unit, the precision thereof being thus verified; and a time certification information transmitting function of transmitting the time certification information thus generated to the client terminal (thirteenth configuration).

Further, the present invention provides a communication protocol program for realizing a communication protocol used when a reference time distributing server distributes a reference time to a time certifying server for certifying a time, the program comprising:

a time receiving function of receiving, from the time certifying server, a time output from the clock unit installed in the time certifying server;

a delay time measuring function of measuring a delay time by using a difference between the time thus received and the time output from the reference clock unit when the reception is executed;

a reference time generating function of generating a reference time by setting forward the reference time output from the reference clock unit installed in the reference time distributing server by the delay time thus measured; and a reference time transmitting function of transmitting the reference time thus generated to the time certifying server (fourteenth configuration).

According to the present invention, time certification can be performed at low cost while keeping high precision and high reliability.

BEST MODE FOR CARRYING OUT THE INVENTION (1) Outline of Embodiment

In the time stamp server according to the present embodiment, a time is measured at a unit of, for example, 100 milliseconds, and a time stamp is issued by using this time.

However, what is important is generally a date in a time stamp although it depends on a certification target. Therefore, it is thought that no adverse influence occurs substantially, even if the second hand is doctored.

Accordingly, in the present embodiment, the time measured by the internal clock in the time stamp server is divided into two parts: a part regarding the time of the units equal to or larger than the unit of minute (Year, Month, Day, Minute); and a part regarding the time of the unit of second (including the unit smaller than one second, such as millisecond), wherein the part regarding the time of the units equal to or larger than the unit of minute is audited by an auditory office, whereas the part regarding the time of the unit of second is caused to be synchronized with a time distributed from a time distributing office.

That is, with respect to the part regarding the units equal to or larger than the unit of minute, coincidence with a reference time is confirmed, whereas the part regarding the unit of second is corrected by using the time distributed from the time distributing office.

Thus, the range, in which the internal clock can be corrected from the outside, is limited to the unit of second, so that doctoring of the part regarding the units equal to or larger than the unit of minute becomes extremely difficult, whereby a high security level can be maintained.

Further, the tamper resistant chip internally installed in the time stamp server performs only comparison between the reference time transmitted from an auditory office and the internal clock, and correction is not applied to the time of the units equal to or larger than the unit of minute, so that there is no need for connecting the time stamp server to the auditory office under the NTP, etc., so that implementing a program in the tamper resistant chip is made easy.

As described above, management of time is so performed that the part requiring security (the part regarding the time of the units equal to or larger than the unit of minute) is separated from the part (the part regarding the unit of second) which is not necessarily important in terms of security but needed for quality assurance, whereby the structure of the time stamp system is simplified.

(2) Details of Embodiment

Figure 1:
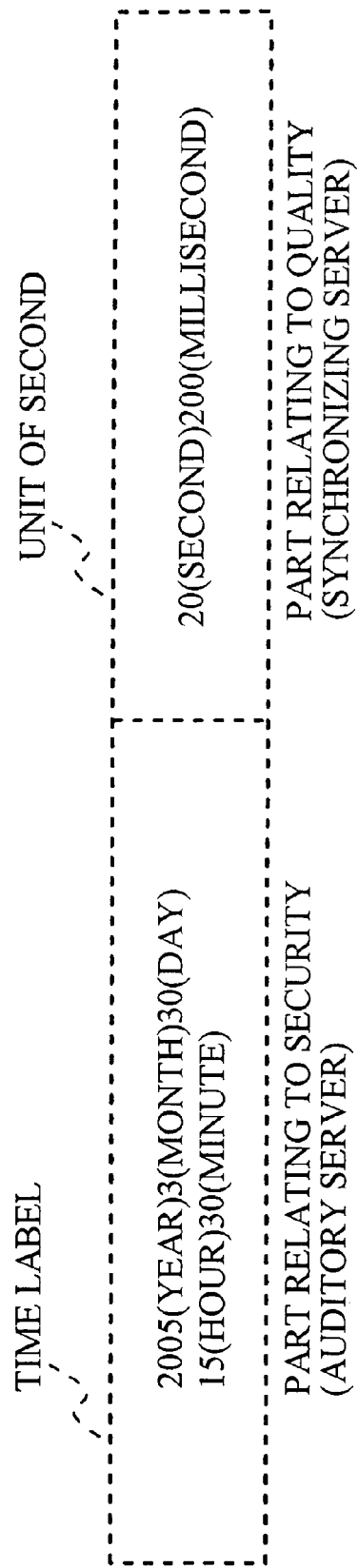
FIG. 1 is a view showing an example of a time measured by an internal clock provided in a time stamp server according to the present embodiment.

FIG. 1 is a view showing an example of a time measured by the internal clock of the time stamp server according to the present embodiment.

The example in the drawing reads "2005(year)03(month)30(day)15(hour)30(minute)20(second)200(millisecond)". Thus, the internal clock in the time stamp server measures a time by the unit of 100 milliseconds.

In the time thus shown, the part regarding the time of the units equal to or larger than the unit of minute, i.e., the part "2005(year)03(month)30(day)15(hour)30(minute)" is a part which requires security when a time stamp is issued, the part being referred to as "time label" hereinafter.

On the other hand, the part regarding the time of the unit of second, i.e., "20(second)200(millisecond)" is a part which provides quality assurance.

The time label (i.e., the part regarding the unit of minute) is audited by an auditory server as later described to confirm it is a correct value, whereas the part regarding the unit of second is corrected by using the time distributed from a time distributing server as later described.

Note that, in the present embodiment, as an example, the time is divided into two parts, i.e., a part regarding security and a part regarding quality assurance while setting the boundary on the unit of second. However, the present invention is not limited thereto, so that the division may be made by a larger or smaller unit in accordance with a target of the time stamp.

More specifically, when the time stamp requires an accurate time to the degree of the unit of second, the part regarding the time of units equal to or larger than the unit of second is audited by the auditory server, and a time of the unit equal to or shorter than 999 milliseconds is corrected by the time distributing server.

Figure 2:
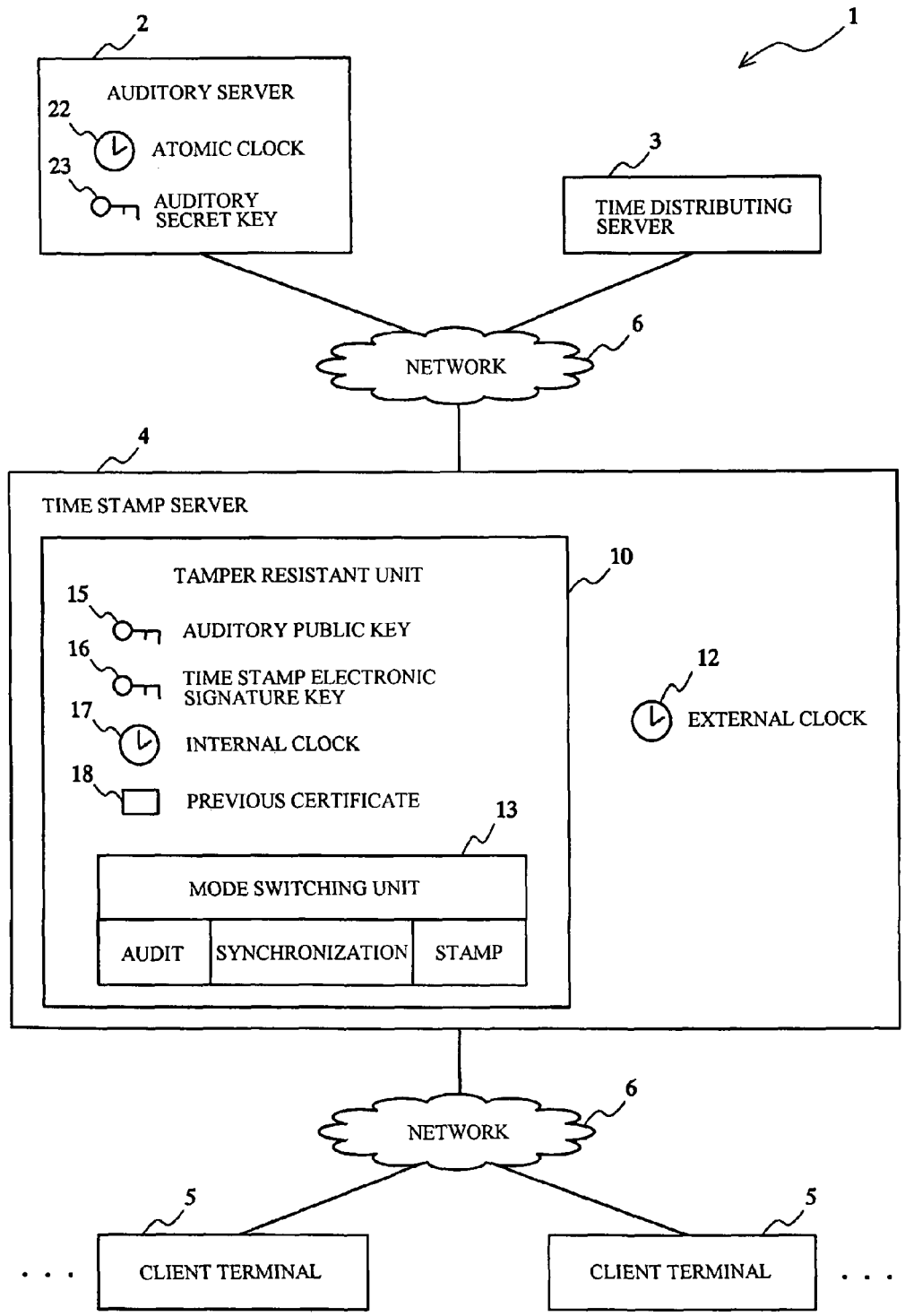
FIG. 2 is a block diagram showing an example of a system configuration of the time stamp system according to the present embodiment.

FIG. 2 is a block diagram showing an example of a system configuration of a time stamp system according to the present embodiment.

The time stamp system 1 includes an auditory server 2, a time distributing server 3, a time stamp server 4, client terminals 5, 5, etc., these being connected to one another via a network 6, such as the Internet.

Note that, in the following descriptions, the client terminals 5, 5, etc. are not distinguished from one another, and are simply denoted as "client terminal 5".

The time stamp server 4 is a server which issues a time stamp in response to the request made by the client terminal 5. Here, the term "time stamp" refers to information for certifying a time when an electronic document is determined. A time stamp certifies a moment when the document began to exist, and that the document has not been doctored since that moment by a third person nor by the very person that prepared the document.

In this embodiment, a conventionally used time stamp is employed as the time stamp.

As an example, the time stamp server 4 causes the client terminal 5 to transmit a hash value (digest value) of an electronic document.

Then, the time stamp server 4 prepares an electronic signature with respect to a time output from the internal clock and a hash value received from the client terminal 5 by using a time stamp electronic signature key, and returns it to the client terminal 5.

This electronic signature is used as a time stamp. Note that the present embodiment is not limited thereto, and can be applied to various types of time stamps each of which certifies a time by using an internal clock.

The time stamp server 4 includes: for example, an external clock 12, installed in a mother board, etc.; and a tamper resistant unit 10 constituted by a tamper resistant chip, etc. The external clock is, for example, a clock unit of a crystal oscillation type. The time stamp server 4 can correct the external clock 12 to the extent of the unit of millisecond by using a distribution time distributed from the time distributing server 3.

The time stamp server 4 and the time distributing server 3 perform communication under NTP, and the time stamp server 4 receives a distribution time.

This communication can be performed by the time processing unit (CPU) installed on the mother board in the time stamp server 4, so that the communication does not need to be performed on the tamper resistant unit 10. Accordingly, the function of communication under NTP can be installed outside of the tamper resistant unit 10, so that the implementation of the tamper resistant unit 10 can be simplified.

Note that as later described, the external clock 12 is used for correcting the part regarding the unit of second of the internal clock 17, so that there is no need for taking an advanced security measure to the correction of the external clock 12.

Accordingly, in the time stamp system 1, it is not necessarily needed to use the time distributing server 3.

As a source of providing a distribution time in place of the time distributing server 3, various types of devices or services can be used, including a time transmitted from a wave clock (a clock which receives a wave informing a standard time, and automatically synchronizes with the standard time) or a GPS (Global Positioning System) satellite, or time announcement.

Further, if a time distribution outputting source as mentioned above is internally installed in the time stamp server 4, there is no need for connecting the time stamp server 4 via a network to the distribution time providing source, so that the configuration of the time stamp system 1 is more simplified.

The tamper resistant unit 10 is constituted by, for example, a tamper resistant chip, which maintains an advanced security.

The tamper resistant chip is an IC chip which is so configured that analyzing of its internal structure or an illegal operation is difficult to perform, and that, when the internal structure is intended to analyze, the chip is automatically destroyed.

Note that the tamper resistant chip is so sealed in an IC chip as to connect to a CPU, a Read Only Memory (ROM), a Random Access Memory (RAM), an Electrically Erasable and Programmable ROM (EEPROM), an input/output interface, an internal clock, etc. via a bus line, so that the tamper resistant chip in itself constitutes a computer.

The tamper resistant unit 10 includes an auditory public key 15, a time stamp electronic signature key 16, an internal clock 17, and a previous certification 18.

Also, a mode switching unit 13 for switching operational modes of the tamper resistant unit 10 is constituted by performing the time stamp program stored in the EEPROM in the CPU of the tamper resistant chip.

The auditory public key 15 is a public key information used for decoding the digital signature attached to the time certification which is transmitted from the auditory server 2.

The time certificate describes a reference time constituted by using output time of the atomic clock of the auditory server 2.

The tamper resistant unit 10 confirms validity of the time certificate by using the digital signature, thereby confirming validity of the reference time.

The time stamp electronic signature key 16 is a secret key information used when the tamper resistant unit 10 performs digital signature with respect to the hash value transmitted from the client terminal 5 and the time output from the internal clock 17.

The internal clock 17 is a clock unit for measuring a time to be certified by the time stamp.

Since the internal clock 17 has such a limitation as to be constituted at the inside of the tamper resistant unit 10, it is difficult to constitute the internal clock 17 as a high-precision clock unit. Accordingly, the precision of the clock is maintained by adopting a configuration in which the tamper resistant unit 10 corrects the unit of second of the internal clock 17 while referring to the external clock 12.

The previous certificate 18 is a time certificate which was transmitted from the auditory server 2 and used when the previous time audit was performed, and has been stored in the EEPROM, etc.

The tamper resistant unit 10 confirms, when confirming the reference time transmitted from the auditory server 2, that the reference time is later than the reference time the tamper resistant unit 10 received from the auditory server 2 at a previous occasion.

In a time stamp, what to avoid most is to issue a time stamp of a backdated time (to output a past time), which is caused by, for example, doctoring the document.

For this reason, the tamper resistant unit 10 confirms that the reference time transmitted from the auditory server 2 is later than the time when the previous auditory is performed (the time described in the previous certificate 18).

When the reference time transmitted from the auditory server 2 is earlier than the time described in the previous certificate 18, an error message or the like is issued and the operation is stopped in the audit mode (to be described later), and no time stamp will be issued.

As described above, issuance of a backdated time stamp can be avoided through the operations of storing a previous reference time, and confirming that the reference time to be used for the audit is later than the previous reference time thus stored.

Note that a default previous certificate 18 is stored in the tamper resistant unit 10 when it is delivered from the factory.

Also, generally speaking, without correcting the time, the internal clock 17 can keep, for approximately several months, a precision to a degree that a margin of error falls within a range of one minute, so that the user of the time stamp server 4 can correct the internal clock 17 during the period of the several months.

The mode switching unit 13 is a function unit for performing switching among operational modes of the tamper resistant unit 10. Examples of the operational mode performed by the tamper resistant unit 10 include an audit mode, a synchronizing mode, and a stamp mode.

The respective operational modes are performed by their corresponding independent modules in such a manner that the respective modules do not interfere with one another.

The audit mode is an operational mode in which it is audited, by using a reference time transmitted from the auditory server 2, whether a time label of the internal clock 17 is correct.

The synchronizing mode is an operational mode in which the part regarding the unit of second of the internal clock 17 is caused to synchronized with an accurate time by using a distribution time distributed from the time distributing server 3. The stamp mode is an operational mode in which a time stamp is issued in response to a request sent from the client terminal 5.

The mode switching 13 switches sequentially the operational modes of the tamper resistant unit 10 in a predetermined order, e.g., in the order of audit mode, stamp mode, synchronizing mode, and audit mode, etc. The mode switching unit 13 does not switch the operational mode of the tamper resistant unit 10 from one mode to another until a currently performed operational mode is completed.

Accordingly, in order to perform an operation in a stamp mode, it is necessary that the audit mode and the synchronizing mode should be completed, and the tamper resistant unit 10 can issue a time stamp of a time which has been subject to auditing and synchronization.

Also, the tamper resistant unit 10 can stop issuance of a time stamp when an error occurs in at least either one of the auditory and synchronizing modes.

Figure 3:
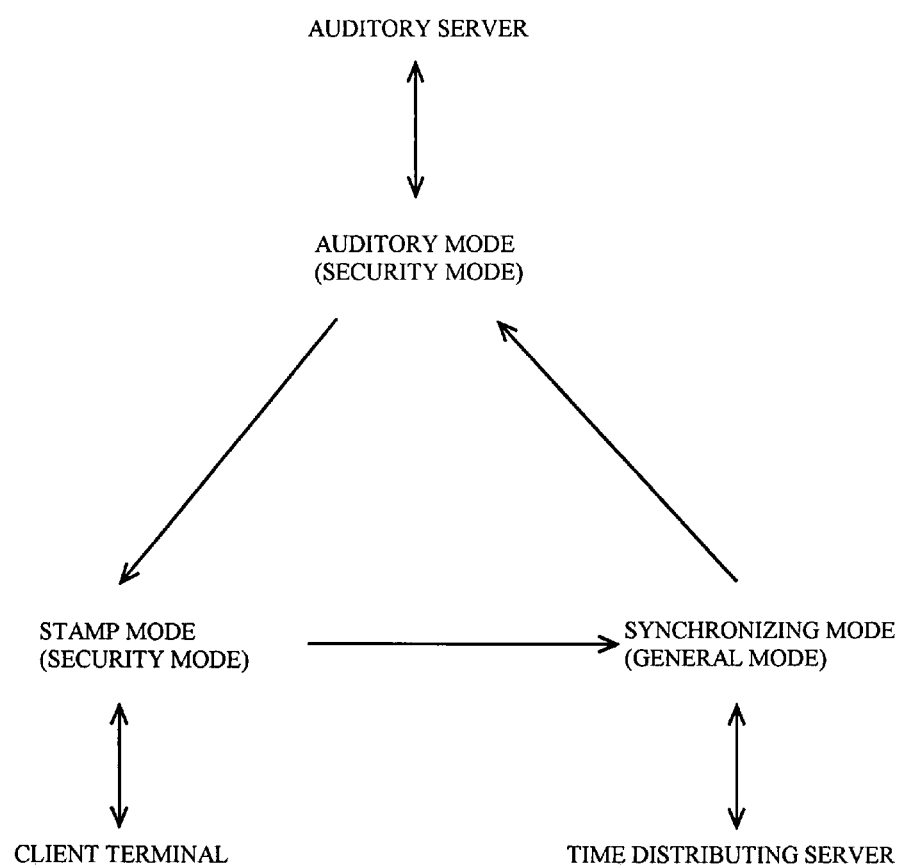
FIG. 3 is a view illustrating switching of operational mode of a tamper resistant unit.

Further, with reference to FIG. 3, switching of the operational modes in the tamper unit 10 will be described in detail. The tamper resistant unit 10 switches sequentially, as shown in FIG. 3, the operational modes in the order of audit mode, stamp mode, synchronizing mode, and audit mode, etc.

Among these operational modes, each of the auditory and stamp modes is an operational mode which requires an advanced security because the mode deals with a time label (hereinafter, referred to as "security mode"), whereas the synchronizing mode is an operational mode which does not necessarily require an advanced security because the synchronizing mode deals with the unit of second (hereinafter, referred to as "general mode").

As described above, the tamper resistant unit 10 is so designed as to perform operations in the manner of switching the security mode and the general mode, thereby avoiding such a situation that an operation requiring high security and an operation not requiring high security are executed at the same time.

In addition, the respective operational modes are activated by their corresponding modules which are independent from one another, so that the tamper resistant unit 10 can prevent the interference between the operation under the security mode and the operation under the general mode, thus exhibiting high resistance against unauthorized accesses such as cracking.

In the tamper resistant unit 10, the switching is performed under the configuration in which the security mode is divided into an audit mode and a stamp mode. However, since the audit mode and the stamp mode are common in that both of them are categorized as security mode, a configuration may be adopted in which audit and issuance of stamp may be performed under the same mode.

As described above, the tamper resistant unit 10 includes operational mode switching means (mode switching unit 13) for performing switching between a first operational mode in which the verification means (which performs a time audit) and time certificate information generating means (which generates a time stamp) operate, and a second operational mode in which the time correcting means (synchronizing by the unit of second) operates, wherein the operational mode switching means switches from one operational mode to the other operational mode after the operations under the one operational mode are completed.

Also, the first operational mode includes a verification mode (audit mode) in which the verification means verifies the clock unit, and a time certification information generating mode (stamp mode) in which the time certification information generating means generates the time certification information, wherein, in the switching between the verification mode and the time certification information generating mode, the mode switching means switches to the other operational mode that serves as a switching destination, after the operations under one operational mode (either one of an audit mode and a stamp mode) that serves as a switching source are completed.

Further, in the present embodiment, switching of the operational mode is performed in the order of synchronizing mode, audit mode, stamp mode, and synchronizing mode, etc., but the order of switching is not limited thereto. The operational mode may be switched in another order, e.g., in the order of audit mode, synchronizing mode, stamp mode, and audit mode, etc.

Returning to FIG. 2, the auditory server 2 is a server which is managed by an auditory office and so connected to the time stamp server 4 via the network 6 as to audit the internal clock 17 provided inside of the time stamp server 4.

The communication line between the auditory server 2 and the time stamp server 4 is enciphered by using, for example, a technique of SSL, thereby making it difficult to crack the system from the outside.

Generally speaking, the auditory office is managed by a third party observed from the carrier managing the time stamp server 4 and from the user of the client terminal 5.

Thus, since a third party manages the auditory server 2, it is substantially impossible that the carrier of the time stamp server 4 and the user of the client terminal 5 conspire to backdate the time stamp, thereby realizing extremely an advanced security.

The auditory server 2 includes an atomic clock 22 and an auditory secret key 23. When a reference time is requested from the time stamp server 4, the auditory server 2 prepares a time certificate describing a time output from the atomic clock 22, writes a signature thereon by using the auditory secret key 23, and transmits it to the time stamp server 4. The atomic clock 22 constitutes a reference clock unit which outputs a reference time.

Note that, while details will be described later, the auditory server 2 measures a delay time in the communication path to the time stamp server 4, and generates a reference time by setting forward the time output from the atomic clock 22 by the delay time.

With this configuration, the reference time recorded on the time certificate received by the time stamp server 4 coincides with the time when the time stamp server 4 actually receives the time certificate.

The time distributing server 3 is a server which is so connected to the time stamp server 4 via the network 6 as to distribute a current time to the time stamp server 4.

The communication line 4 between the time distributing server 3 and the time stamp server 4 is enciphered by using, for example, SSL, and a time is distributed via the enciphered communication path by using, for example, NTP.

Thus, since the communication path between the time distributing server 3 and the time stamp server 4 is enciphered, cracking from the outside is difficult to perform.

Further, using NTP, the time distributing server 3 can provide a not-delayed time to the time stamp server 4 at a precision of approximately millisecond.

Figure 4:
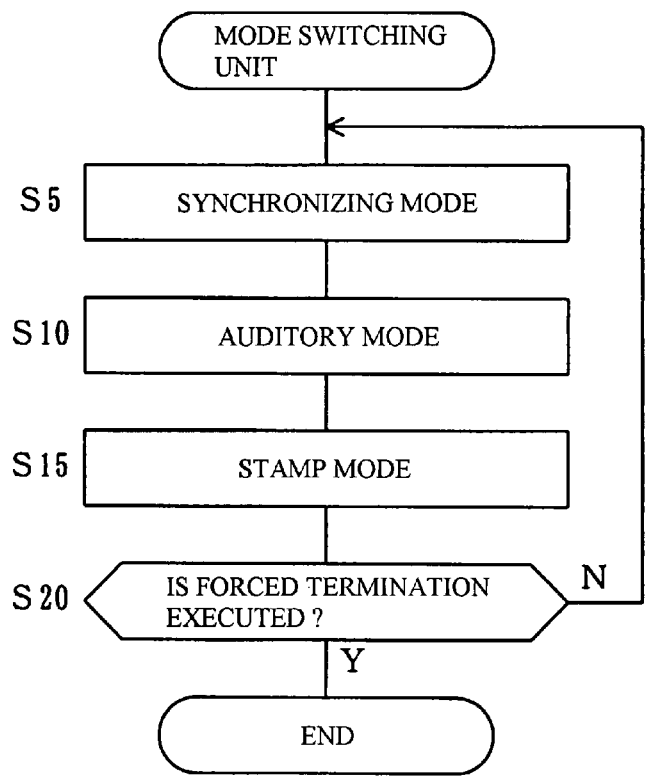
FIG. 4 is a flowchart illustrating switching of operational mode of a tamper resistant unit.

FIG. 4 is a flowchart illustrating switching of mode in the tamper resistant unit 10, the switching of mode being performed by the mode switching unit 13.

While the operation may be started from either of the synchronizing mode and the audit mode, it is desired that the stamp mode comes after the synchronizing mode and the audit mode because a time stamp should be issued at a time which is assured at the auditory server 2 and synchronized at the time distributing server 3.

Also, after starting the time stamp server 4, the stamp mode is performed after performing the synchronizing mode and audit mode.

First, the mode switching unit 13 causes the tamper resistant unit 10 to operate in the synchronizing mode (step 5).

In the synchronizing mode, the tamper resistant unit 10 refers to the part regarding the unit of second of the time output from the external clock 12, and constitutes an internal clock 17 by using this. With this operation, the internal clock can be corrected by the unit of millisecond.

This processing is performed through the operations that the tamper resistant unit 10 requests the CPU, installed in the mother board of the time stamp server 4, of inputting thereinto a time output from the external clock 12.

Into the tamper resistant unit 10, the part regarding the unit of second of the time output from the external clock 12 is input. However, another configuration may be adopted in which the time of all the units is input to the tamper resistant unit 10, and the tamper resistant unit 10 refers to the part regarding the unit of second.

Note that, when the synchronizing mode is not completed, for example, because an error occurs, the mode switching unit 13 stops while keeping the operational mode of the tamper resistant unit 10 to the synchronizing mode.

This configuration can avoid issuance of a time stamp of a time to which synchronization has not been applied.

When correction by the unit of second is completed in the synchronizing mode, the mode switching unit 13 switches the operational mode of the tamper resistant unit 10 to an audit mode (STEP 10).

In the audit mode, the tamper resistant unit 10 requests the auditory server 2 of issuing a time certificate. The tamper resistant unit 10 receives, in response thereto, a time certificate transmitted from the auditory server 2, and compares a time label of the reference time described on the time certificate with a time label of the time output from the internal clock 17.

When these time labels do not coincide with each other, the mode switching unit 13 does not switch the operational mode of the tamper resistant unit 10 but maintains the audit mode and stops.

This configuration can avoid issuance of a time stamp of a time to which an audit has not been applied.

When in the audit mode the audit of the time label is completed, the mode switching unit 13 switches the operational mode of the tamper resistant unit 10 to a stamp mode (STEP 15).

In the stamp mode, the tamper resistant unit 10 receives a request of issuing a time stamp transmitted from the client terminal 5, and issues a time stamp.

The tamper resistant unit 10 can issue a time stamp freely during the stamp mode.

When an error occurs in the stamp mode, the mode switching unit 13 maintains the operational mode of the tamper resistant unit 10 to a stamp mode.

Specifically, the tamper resistant unit 10 receives a hash value (certification target information) of the electric document that is a time certification target from the client terminal 5 (certification target information receiving means), and generates a time stamp (time certification information) of the hash value of the electronic document by using the time output from the internal clock 17, the accuracy of the time being verified (time certification information generating means). Then, the tamper resistant unit 10 transmits the time stamp thus generated to the client terminal 5 (time certification information transmitting means).

When the stamp mode is completed, the mode switching unit 13 performs, so long as no particular reason occurs, the infinite loop of the steps 5 to 20 (STEP 20; N) instead of performing forced termination, so that the tamper resistant unit 10 returns to the synchronizing mode (STEP 5).

When the time stamp is forcedly terminated (STEP 20; Y), the mode switching unit 13 terminates mode switching.

The forced termination can be executed in various manners. For example, the forced termination may be executed when the loop of STEP 5 to STEP 20 is repeated at predetermined times, or may be executed under the judgment of the administrator.

As described above, the mode switching unit 13 sequentially performs switching of operational modes. In the present embodiment, a configuration is adopted in which the infinite loop is roundly performed for about an hour because the reference time of the time certificate continues to be valid for, for example, one hour.

The time period required to perform the synchronizing mode and the audit mode is about a few minutes, so that the tamper resistant unit 10 can operates almost all the time in the stamp mode.

Figure 5:
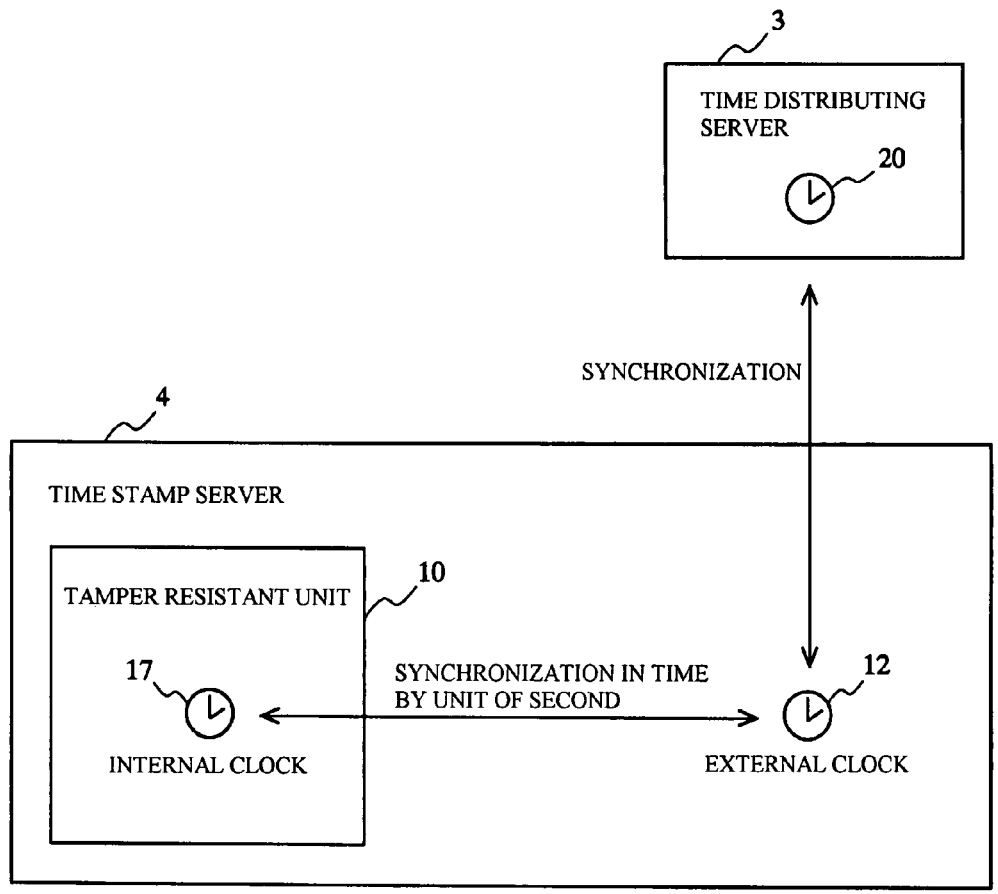
FIG. 5 is a drawing illustrating operations of the time stamp server in a synchronizing mode.

FIG. 5 is a view describing the operations of the time stamp server 4 in the synchronizing mode.

First, the relationship between the time stamp server 4 and the time distributing server 3 will be described.

The time stamp server 4 requests, when correcting the external clock 12, the time distributing server 3 of distributing a current time.

The time distributing server 3 has an internal clock 20 which keeps an accurate time, which is distributed from, for example, an atomic clock, and transmits the time to the time stamp server 4.

The time stamp server 4 corrects the external clock 12 by using a time distributed from the time distributing server 3.

The time stamp server 4 can perform correcting operations independently from the operational mode of the tamper resistant unit 10.

The time stamp server 4 can always keep the external clock 12 accurate by correcting the external clock 12 at a frequency (for example, approximately once an hour) needed for maintaining the accuracy of the external clock 12.

Next, the relationship between the tamper resistant unit 10 and the external clock 12 will be described.

The tamper resistant unit 10 requests the external clock 12 (more correctly speaking, the CPU installed in the mother board of the time stamp server 4) of outputting the part regarding the unit of second at the current time.

Then, the tamper resistant unit 10 incorporates, in response to the request, the part regarding the unit of second into the inside of the tamper resistant unit 10, and corrects the second unit of the internal clock 17.

The external clock 12 measures time at a high precision by using the distribution time distributed from the time distributing server 3, so that the tamper resistant unit 10 can constitute the internal clock 17 at a high precision.

Specifically, the tamper resistant unit 10 can cause, by means of the external clock 12, the unit of second of the internal clock 17 to synchronize with the accurate time of the internal clock 20 of the time distributing server 3.

As described above, the tamper resistant unit 10 refers only to the part regarding the unit of second out of the output time of the external clock 12, whereby even if the time of the external clock 12 is doctored, the range of doctoring is limited to the part regarding the unit of second of the time described in the time stamp.

Accordingly, the time label receives no influence in the synchronizing mode, thereby realizing an advanced security.

Figure 6:
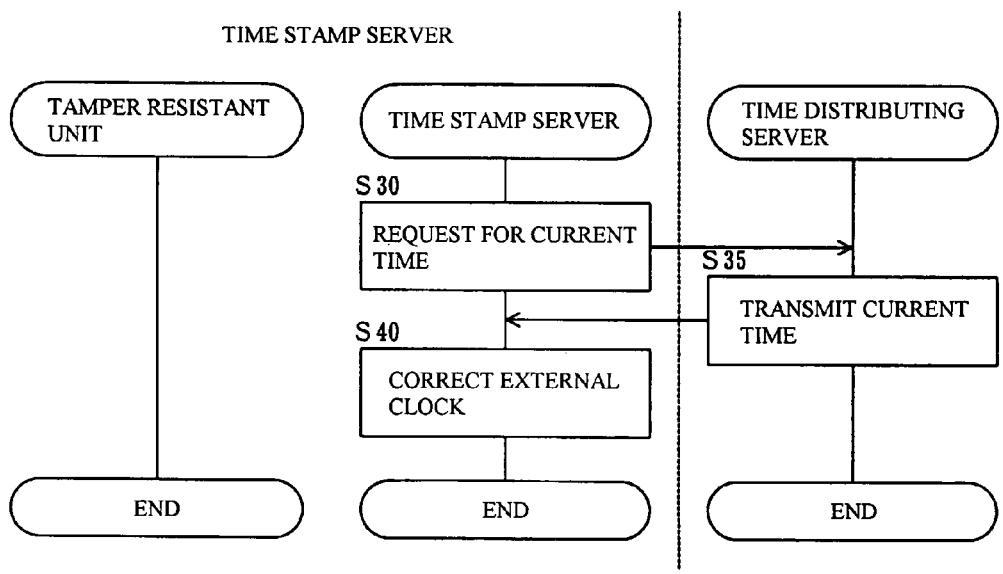
FIG. 6 is a flowchart illustrating a procedure in which the time stamp server causes an external clock to synchronize.

FIG. 6 is a flowchart showing procedures in which the time stamp server 4 causes the external clock 12 to synchronize.

The following operations are performed by the CPU installed in the mother board of the time stamp server 4 and the CPU installed in the time distributing server 3 in accordance with a predetermined program.

Note that the time stamp server 4 has, other than the CPU installed in the mother board, a CPU in the tamper resistant unit 10. Accordingly, in order to make distinction therebetween, in FIG. 6, the time stamp server 4 is divided into a "time stamp server" realized by the CPU provided on the mother board and a "tamper resistant unit" realized by the CPU of the tamper resistant unit 10.

First, the time stamp server 4 requests the time distributing server 3 of transmitting a current time (STEP 30).

In response to this request, the time distributing server 3 transmits the current time output from the internal clock 20 to the time stamp server 4 (STEP 35).

The time stamp server 4 receives the current time transmitted from the time distributing server 3, and corrects the external clock 12 (STEP 40). With these operations, the correcting processing of the external clock 12 is terminated.

Note that, since the internal clock 17 refers only to the unit of second of the external clock 12, it is sufficient that the correction of the external clock 12 is performed by the unit of second.

Figure 7:
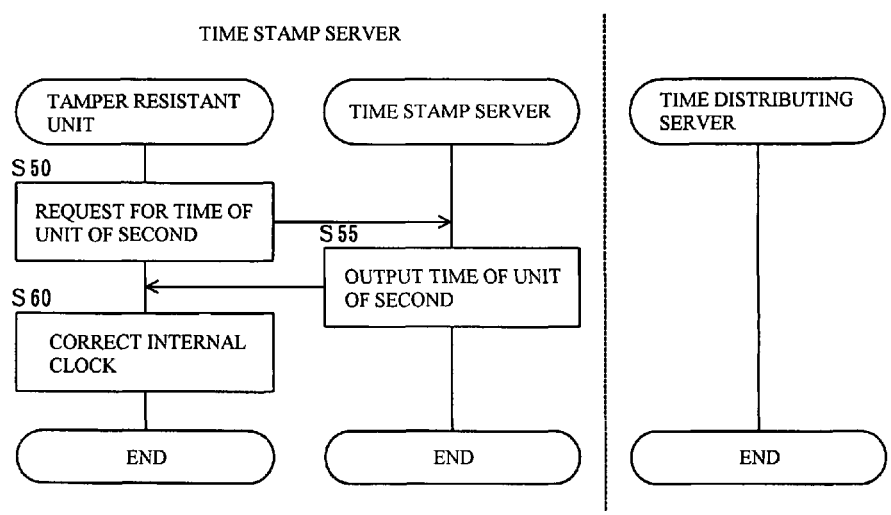
FIG. 7 is a flowchart illustrating a procedure in which the time stamp server causes an internal clock to synchronize.

FIG. 7 is a flowchart illustrating the procedures in which the time stamp server 4 causes the internal clock 17 to synchronize.

As in the flowchart of FIG. 6, the following operations are performed by the CPU installed in the tamper resistant unit 10 and the CPU installed in the mother board of the time distributing server 3.

First, the tamper resistant unit 10 requests the time stamp server 4 of outputting a time of the unit of second measured by the external clock 12 (STEP 50).

In response to this request, the time stamp server 4 outputs the time of unit of second output from the external clock 12 to the tamper resistant unit 10 (STEP 55).

The tamper resistant unit 10 acquires a time of unit of second from the time stamp server 4, and corrects the time of unit of second out of the time measured by the internal clock 17 by using the time of unit of second thus obtained (STEP 60).

As described above, the tamper resistant unit 10 includes: correction time acquiring means for acquiring a correction time from a corrected time generating unit (external clock 12); and time correcting means for correcting a time of a unit smaller than the predetermined unit (here, unit of second) in the time measured by the clock unit by using the correction time thus acquired.

As described above, the tamper resistant unit 10 corrects the internal clock 17. More specifically, the tamper resistant unit 10 compares the unit of second of the internal clock 17 with the unit of second acquired from the time stamp server 4, and terminates the processing without applying any particular correcting processing thereto when they coincide with each other, whereas the tamper resistant unit 10 corrects the unit of second of the internal clock 17 to the unit of second acquired from the time stamp server 4 when they do not coincide with each other.

Note that, in view of ordinary precision of the internal clock 17, it does not happen that, during the period of time of correction performed by the internal clock 17, the time in a unit of second is set forward or backward to the extent that the time label of the internal clock 17 should be changed. Accordingly, the accuracy of the time measured by the internal clock 17 can be assured with respect to both of the time label and the unit of second only by correcting the unit of second.

Figure 8:
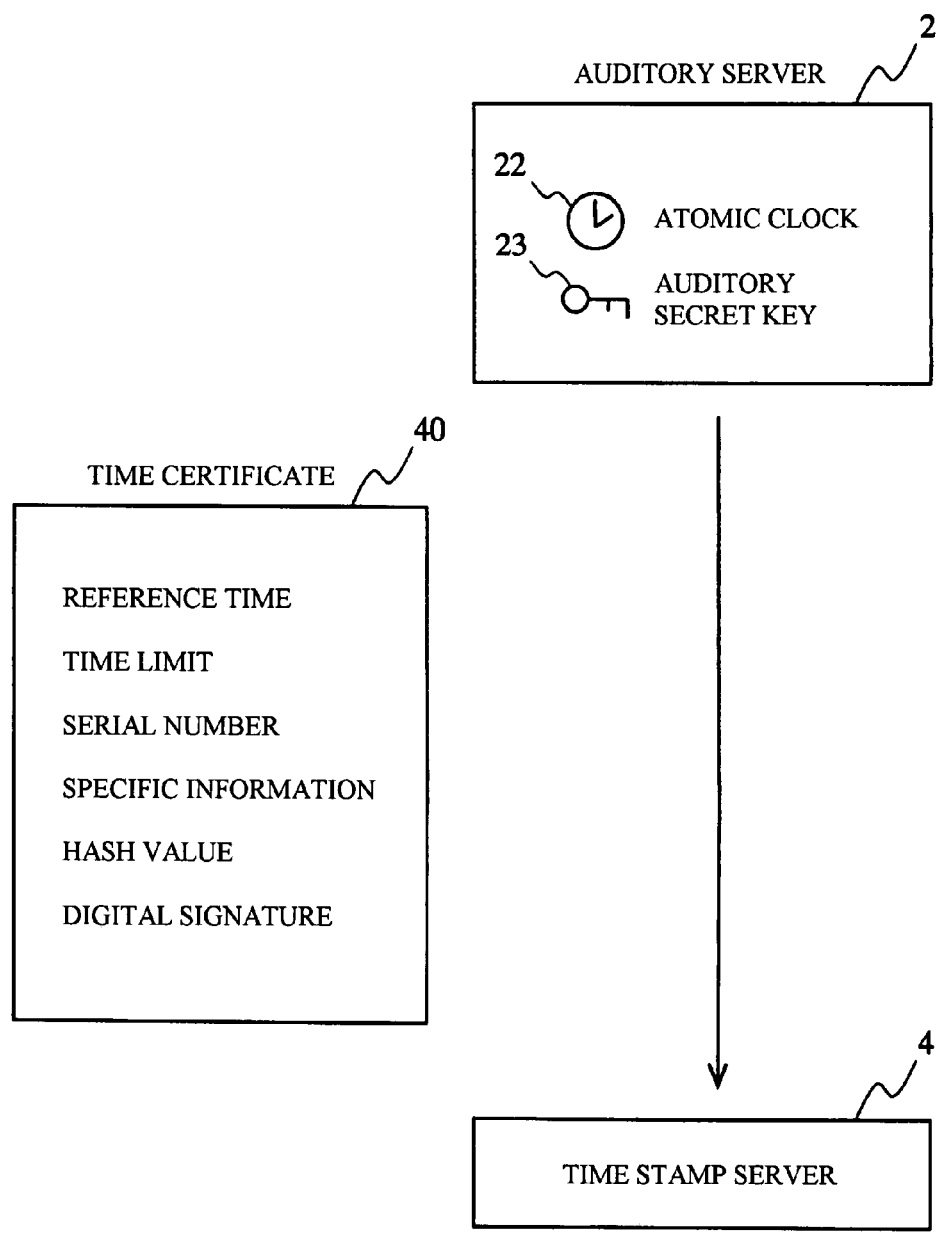
FIG. 8 is a view illustrating operations of the time stamp server and the auditory server.

FIG. 8 is a view illustrating the operations of the time stamp server 4 and the auditory server 2 in the audit mode.

When the operational mode of the tamper resistant unit 10 is switched to an audit mode, the time stamp server 4 requests, in response to the request of the tamper resistant unit 10, the auditory server 2 of transmitting a reference time.

The auditory server 2 prepares, when receiving the reference time transmitting request from the time stamp server 4, a time certificate 40 while referring to the time output from the atomic clock 22, applies a digital signature thereto by means of the auditory secret key 23, and transmits it to the time stamp server 4.

In the time certificate 40, a reference time, a time limit, a serial number, specific information, a hash value, a digital signature, etc. are recorded.

The reference time is a current time output from the atomic clock 22. Note that, in more detail, the auditory server 2 measures a delay time occurring in the communication with the time stamp server 4, and adjusts the current time in view of this, which will be described later.

The time limit is a time period during which the reference time recorded in the time certificate 40 is valid. More specifically, the output time of the internal clock 17, which is audited by means of the reference time recorded on the time certificate 40, is secured by the auditory office in terms of its accuracy during the time limit.

The serial number is a number described in the time certificate, the number being given in the order of issuance thereof by the auditory server 2. In this embodiment, the serial number is constituted by random numbers because, if consecutive numbers are given, speculation from the outside becomes easy.

The specific information is information specific to the hardware of the time stamp server 4, such as ID information of the tamper resistant unit 10. When the specific information does not coincide with each other, the tamper resistant unit 10 issues an error.

Note that, other than the above-mentioned items, a period of validity of the time certificate 40, a common key used for communication between the time stamp server 4 and the auditory server 2, which is obtained after the validity of the time certificate 40 is confirmed, and so on can be included in the time certificate 40.

The hash value is obtained through calculation by means of a hash function applied to the information used for preventing doctoring, such as current time, time limit, serial number, specific information.

The digital signature is obtained by enciphering the hash value by means of auditory secret key 23.

The time stamp server 4 passes, when receiving the time certificate 40 from the auditory server 2, the time certificate 40 to the tamper resistant unit 10.

The tamper resistant unit 10 confirms, after confirming the coincidence between the time label of the reference time described in the time certificate 40 and the time label of the internal clock 17, validity of the time certificate 40 by using the digital signature.

Figure 9:
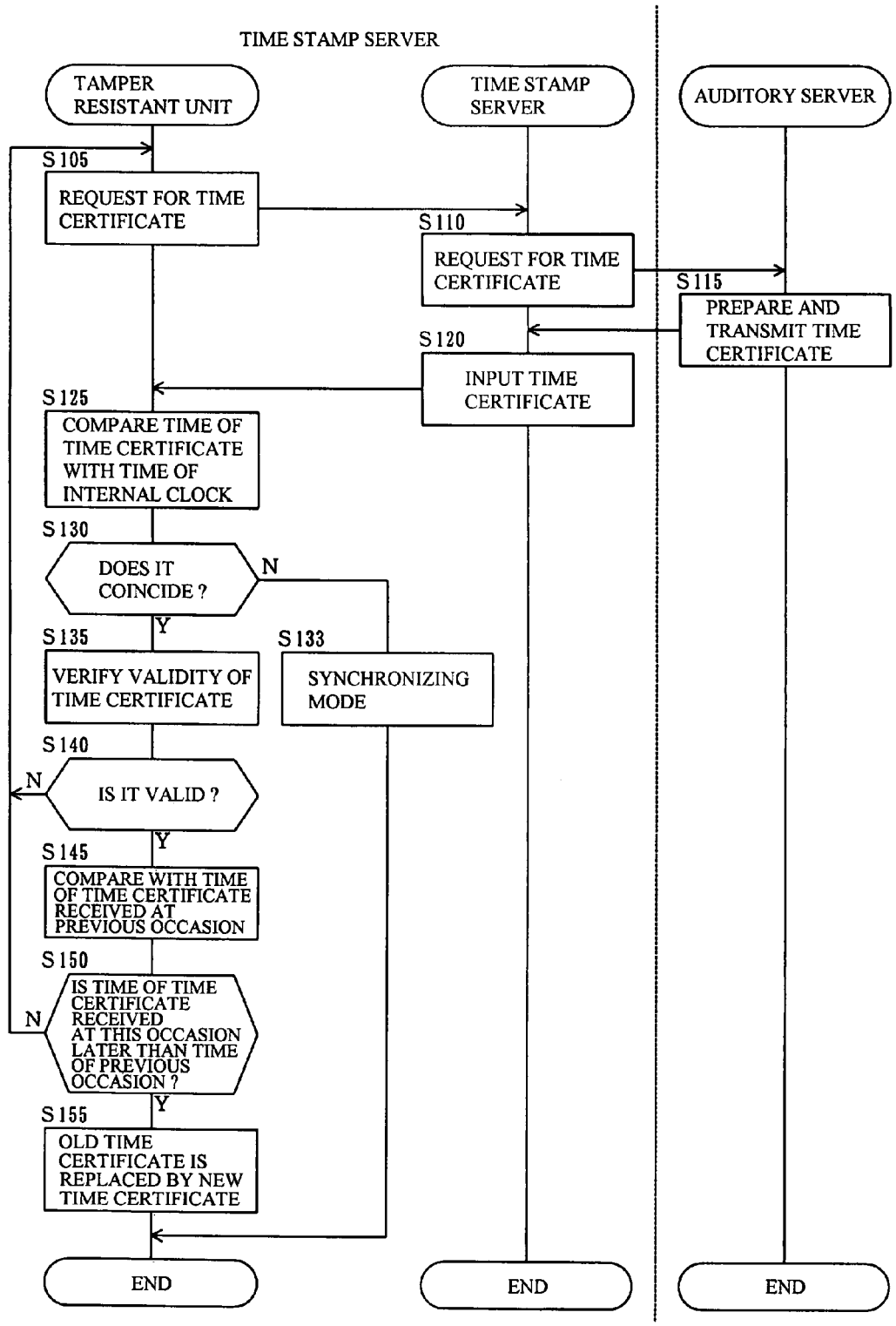
FIG. 9 is a flowchart illustrating a procedure in which the time stamp server and the auditory server perform an audit.

FIG. 9 is a flowchart illustrating the procedures in which the time stamp server 4 and the auditory server 2 audit the time label.

First, the tamper resistant unit 10 requests the CPU of the time stamp server 4 (hereinafter, referred to as "time stamp server 4) of issuing a time certificate (STEP 105).

In response to the request, the time stamp server 4 requests the auditory server 2 of issuing a time certificate (STEP 110).

In response to the request of issuance of time certificate given from the time stamp server 4, the auditory server 2 prepares a time certificate 40, and transmits it to the time stamp server 4 (STEP 115).

The time stamp server 4 receives the time certificate transmitted from the auditory server 2, and inputs it into the tamper resistant unit 10 (STEP 120).

The tamper resistant unit 10 receives the time certificate from the time stamp server 4, and compares the reference time described on the time certificate with the time of the internal clock 17 (STEP 125).

This comparison is performed by means of a time label, i.e., performed by the unit of minute, not by the unit of second. For example, when the time described on the time certificate 40 is "2005(year)03(month)20(day)12(hour)30(minute)3(second)200(millisecond)" and the time of the internal clock 17 is "2005(year)03(month)20(day)12(hour)30(minute)0(second)500(millisecond)", the tamper resistant unit 10 judges that both of the times coincide with each other because both are the same in the units equal to or larger than the unit of minute.

Thus, the tamper resistant unit 10 includes reference time receiving means for receiving a reference time from the auditory server 2 (reference time distributing server).

Also, the tamper resistant unit 10 includes first time acquiring means for acquiring a time of a unit equal to or larger than a predetermined unit (here, larger than the unit of minute) from the time output from the internal clock 17.

When the time described in the time certificate 40 and the time of the internal clock 17 do not coincide with each other (STEP 130; N), the tamper resistant unit 10 returns to the synchronizing mode (STEP 133).

Note that, considering the case in which an accidental error hinders the coincidence between the time described in the time certificate and the time of the internal clock 17, a configuration may be adopted in which, when the time described in the time certificate 40 and the time of the internal clock 17 do not coincide with each other (STEP 130; N), the tamper resistant unit 10 returns to STEP 105 and requests issuance of a time certificate again. In this configuration, a configuration may be adopted in which in case the number of non-coincidence between the time described in the time certificate and the time of the internal clock 17 reaches predetermined times, processing goes to the step 133. Alternatively, a configuration may be adopted in which when the time described in the time certificate 40 and the time of the internal clock 17 do not coincide with each other (STEP 130; N), without STEP 133, the processing returns to STEP 105. In this configuration, a configuration may be adopted in which, when the audit results in failure at predetermined times, the tamper resistant unit 10 issues an error and stops the operation.

When both of the times coincide with each other (STEP 130; Y), the tamper resistant unit 10 confirms validity of the time certificate 40 (STEP 135).

As described above, the tamper resistant unit 10 includes verification means for verifying that the clock unit operates at an accuracy falling within a predetermined range (the units equal to or larger than the unit of minute) by confirming that, in the time of the units equal to or larger than a predetermined unit (the unit of minute), the time acquired by the first time acquiring means and the reference time thus received coincide with each other.

The validity is confirmed through the operations in which the digital signature attached to the time certificate 40 is decoded by means of the auditory public key 15 so as to extract a hash value, the same hash function as used in the auditory server 2 is used to obtain a hash value from the time certificate 40, and coincidence between both of the hash values is confirmed.

Also, when an expiration date of the time certificate 40 is attached to the time certificate 40, it is confirmed whether the time certificate 40 has not expired.

As described above, the comparison between the time of time certificate 40 and the time of the internal clock 17 is performed before confirming the validity of the time certificate 40 because comparison between the times must be performed as swiftly as possible.

Specifically, if the comparison between the times is performed after confirming the validity, the time of the internal clock 17 proceeds by the amount of time needed for confirming the validity, so that the difference in time between the time of the internal clock 17 and the time described in the time certificate 40 becomes large.

In view of the above-described situation, a configuration may be adopted in which, in order to save the time for decoding, the reference time of the time certificate is not enciphered.

When the time certificate 40 is not valid (STEP 140; N), the tamper resistant unit 10 returns to STEP 105.

When the time certificate 40 is valid (STEP 140; Y), the tamper resistant unit 10 judges the sequence context between the reference time described in the previous certificate 18 (FIG. 2) and the reference time described in the time certificate 40 (STEP 145).

When the reference time described in the time certificate 40 is a time earlier than the reference time described in the previous certificate 18 (STEP 150; N), the tamper resistant unit 10 returns to STEP 105.

In contrast, when the reference time described in the time certificate 40 is a time later than the reference time described in the previous certificate 18 (STEP 150; Y), the previous certificate 18 is replaced by the time certificate 40 received this time by, for example, overwriting the certificate 40 onto the certificate 18.

An audit error may occur depending on the state of the communication line. In such a case, the tamper resistant unit 10 returns to STEP 105 and requests the auditory server 2 of issuing the time certificate every time such an audit error occurs. The auditory server 2, for example, counts the number such requests, and transmits, when the counted number reaches predetermined times, a command of stopping the tamper resistant unit 10 to the time stamp server 4. Thus, when it is supposed that a trouble occurs in the time stamp server 4, the auditory server 2 can stop the tamper resistant unit 10.

Figure 10:
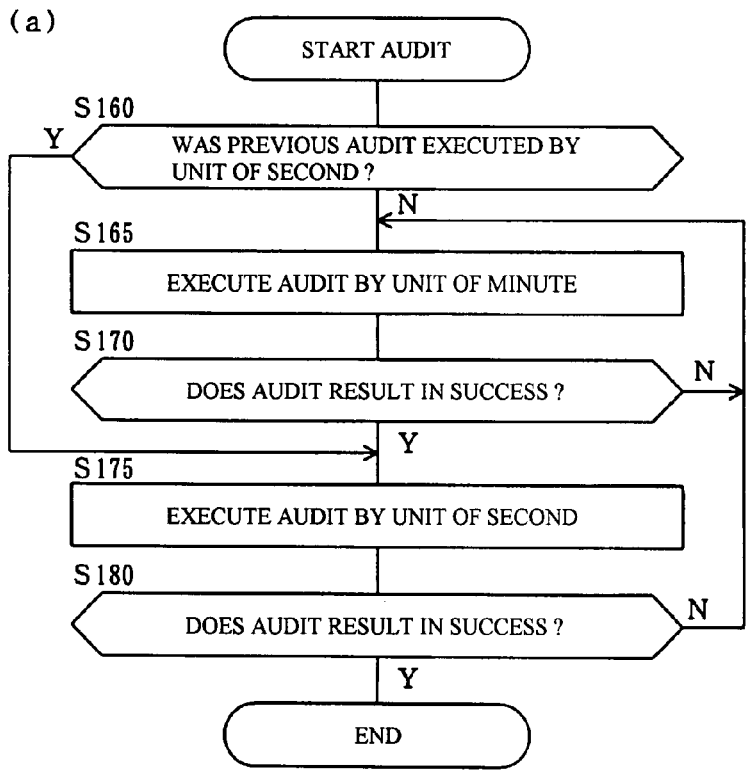
FIG. 10 is a flowchart illustrating the case where the internal clock is audited stepwise.
Figure 10:
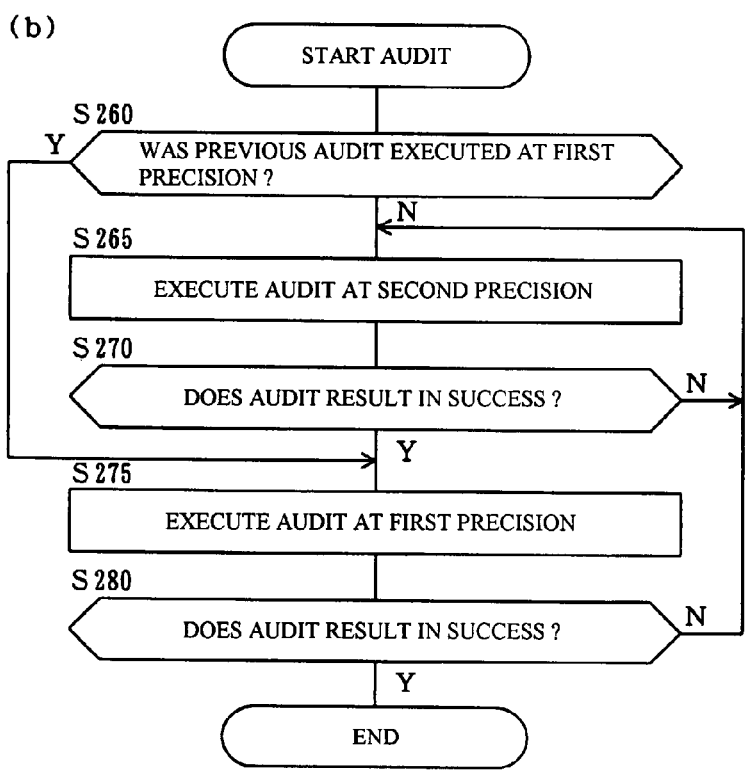

In the above-mentioned example, the time label is prepared by the units equal to or larger than the unit of minute, a case will be described with reference to the flowchart of FIG. 10(*a*) in which time audit is performed at a smaller unit. Here, descriptions will be made while adopting, as an example, a case where the time label is prepared by the units equal to or larger than the unit of second.

As described above, when a time audit is executed at a smaller unit, the time audit is performed stepwise from a larger unit to a smaller unit.

First, when an audit mode is started, the tamper resistant unit 10 confirms whether the time audit was performed by the unit of second at the previous occasion (STEP 160).

In the case where the time audit by the unit of second was not performed at the previous occasion (STEP 160; N), the case including the case where the time audit is performed for the first time after the shipment from the factory and the case where the tamper resistant unit 10 is reset, the auditory server 2 and the tamper resistant unit 10 perform an audit by the unit of minute (STEP 165).

The audit is so performed that the tamper resistant unit 10 acquires a time certificate from the auditory server 2, and confirms, by using the time certificate, whether the internal clock 17 coincides, by the unit of minute, with the time of the time certificate.

More specifically, the tamper resistant unit 10 confirms that the time of the internal clock 17 falls within a range of ±30 seconds from the time described in the time certificate.

When the internal clock 17 does not coincide by the unit of minute, the audit results in failure (STEP 170; N), so that the tamper resistant unit 10 returns to STEP 165, obtains a time certificate from the auditory server 2, and performs audit by the unit of minute.

Thus, when the audit results in failure due to an accidental error, etc., the tamper resistant unit 10 tries to perform an audit again.

In contrast, when the time audit by the unit of second is performed at the previous time audit (STEP 160; Y), or when the time of the internal clock 17 coincides with the time of the time certificate by the unit of minute and therefore the audit results in success (STEP 170; Y), the tamper resistant unit 10 performs an audit by the unit of second (STEP 175). The audit is performed through the operations in which the tamper resistant unit 10 obtains a time certificate from the auditory server 2, and confirms whether the internal clock 17 coincides by the unit of second.

More specifically, the tamper resistant unit 10 confirms whether the time of the internal clock 17 falls within a range of ±500 milliseconds from the time described in the time certificate.

The time of the internal clock 17, by the unit of second, is synchronized with the external clock 12 in the synchronizing mode, so that, when the time of the internal clock 17 coincides by the unit of minute, it is supposed that the time of the internal clock 17, by the units equal to or smaller than the unit of second, operates at the precision of the external clock 12 (usually approximately millisecond).

Accordingly, when an audit by the unit of minute results in success, it is expected that the internal clock 17 operates at a precision of approximately millisecond, so that the audit can be shifted to the audit by the unit of second without passing through the audit of an intermediate stage, such as an audit by the unit of 30 seconds.

When the internal clock 17 does not coincide by the unit of second, the audit results in failure (STEP 180; N), so that the tamper resistant unit 10 returns to STEP 165, and obtains a time certificate from the auditory server 2 so as to perform an audit by the unit of minute.

In the above-described way, when the time audit by the unit of second results in failure due to an accidental error or the like, the tamper resistant unit 10 tries to perform a time audit by the unit of minute again.

In contrast, when the time of the internal clock 17 coincides with the time of the time certificate by the unit of second and therefore the audit results in success (STEP 180; Y), the tamper resistant unit 10 terminates the audit mode.

As described above, the tamper resistant unit 10 performs a time audit by the unit of minute (low precision), and when the audit results in success, the tamper resistant unit 10 performs the time audit by the unit of second (high precision). When the time audit by the unit of second results in success, the tamper resistant unit 10 continues to perform the time audit by the unit of second in the audit mode of the next time.

In contrast, when the time audit by the unit of second results in failure, the tamper resistant unit 10 tries to perform a time audit again at a degraded level, i.e., a time audit by the unit of minute (or alternatively, considering a case where an accidental error occurs, time audits by the unit of second may be repeated at predetermined times), and confirms whether the failure is caused by an accidental error, such as delay in communication, and continues to perform the time audit at the high precision when the cause is an accidental error.

As described above, when an error takes place while a time audit at high precision is being performed, the precision of the time audit is degraded to a lower level so as to confirm whether the error continues to take place at the time audit performed at such a lower precision. Thereby, a time audit can be performed appropriately even when an accidental time audit error, such as fluctuation in delay time caused by communication state of the network, takes place.

As described above, the tamper resistant unit 10 includes predetermined unit changing means for changing a predetermined unit in such a manner that the predetermined unit is changed from the unit of one minute to the unit of one second.

Also, the tamper resistant unit 10 sets the predetermined unit to a first unit (e.g., one minute), and sets the predetermined unit to a second unit (e.g., one second), which is smaller than the first unit, when the verification means verifies the precision of the clock unit by using the first unit.

Next, with reference to FIG. 10(*b*), the above-mentioned procedure will be explained by way of more generalized descriptions.

Here, the first precision is a precision higher than the second precision, and when the tamper resistant unit 10 performs a time audit at a higher precision, the time audit is performed stepwise from a lower precision to a higher precision.

First, when the audit mode is started, the tamper resistant unit 10 confirms whether the previous time audit was performed at the first precision (STEP 260).

When the previous time audit was not performed at the first precision (STEP 260; N), the auditory server 2 and the tamper resistant unit 10 perform a time audit at the second precision (STEP 265).

This is performed through the operations in which the tamper resistant unit 10 obtains a time certificate from the auditory server 2, and confirms, by using this, whether the internal clock 17 coincides at the second precision.

More specifically, the tamper resistant unit 10 confirms that the time of the internal clock 17 falls within a predetermined time period of the time described in a time certificate (e.g., within ±(half of the shortest time period which can be measured at the second precision)).

When the internal clock 17 does not coincide at the second precision, the audit results in failure (STEP 270; N), the tamper resistant unit 10 returns to STEP 260, obtains a time certificate from the auditory server 2, and performs an audit by the second unit.

As described above, when the audit results in failure due to an accidental error or the like, the tamper resistant unit 10 tries to perform an audit again.

In contrast, when the previous time audit was performed at the first precision (STEP 260; Y), or when the time of the internal clock 17 coincides with the time of the time certificate at the second precision and therefore the audit results in success (STEP 270;Y), the tamper resistant unit 10 performs an audit at the first precision (STEP 275). This is performed through the operation in which the tamper resistant unit 10 obtains a time certificate from the auditory server 2, and confirms, by using this, that the internal clock 17 coincides at the first precision.

In more detail, the tamper resistant unit 10 confirms that the time of the internal clock 17 falls within a predetermined time period of the time described in a time certificate (e.g., within ±(half of the shortest time period which can be measured at the first precision)).

When the internal clock 17 does not coincide at the first precision, the audit results in failure (STEP 280; N), so that the tamper resistant unit 10 returns to STEP 265, obtains a time certificate from the auditory server 2, and performs a time audit at the second precision.

In this way, when the time audit by the unit of second results in failure due to an accidental error or the like, the tamper resistant unit 10 tries again to perform an audit at the second precision.

In contrast, when the time of the internal clock 17 coincides with the time of the time certificate at the first precision and therefore the audit results in success (STEP 280; Y), the tamper resistant unit 10 terminates the audit mode.

Next, descriptions will be made as to a protocol used when the auditory server 2 distributes a reference time to the time stamp server 4.

For example, when the time label is prepared by the units equal to or larger than the unit of minute, the delay time in the communication path between the auditory server 2 and the time stamp server 4 is, generally speaking, much smaller than one minute, there is no need for taking specific measures against the delay. However, when the time label is audited by the unit of second, an influence caused by the delay occurring in the communication path is corrected by using the following protocol.

Figure 11:
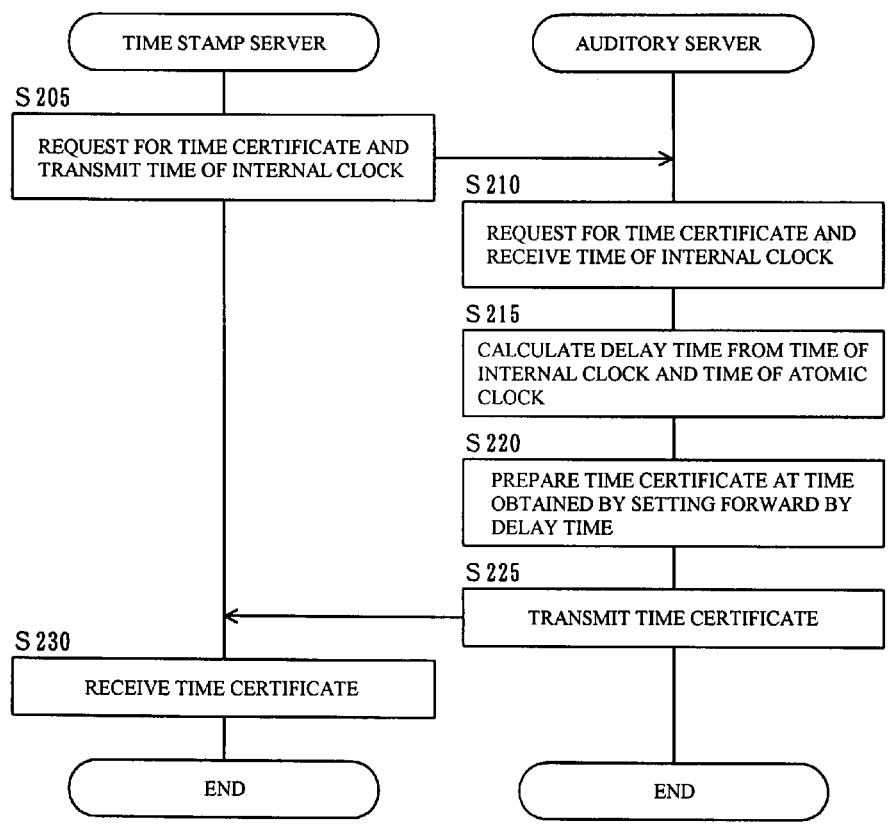
FIG. 11 is a flowchart illustrating a protocol used for a time audit.

FIG. 11 is a flowchart explaining a protocol used in a time audit.

First, the time stamp server 4 requests the auditory server 2 of transmitting a time certificate, and also transmits a current time of the internal clock 17 to the auditory server 2 (STEP 205).

Accordingly, the auditory server 2 receives, from the time stamp server 4, the request of time certificate and the time of the internal clock 17 (STEP 210).

The time of the internal clock 17 coincides with the external clock 12, so that the time is, generally speaking, accurate to the degree the unit of millisecond. Therefore, the auditory server 2 calculates the delay time by subtracting the time of the internal clock 17 from the current time of the atomic clock 22 installed in the auditory server 2 (STEP 215).

Note that, when the delay time is extremely long beyond a rational range, such a procedure as stopping the time stamp server 4 is taken.

Next, the auditory server 2 generates a reference time by using the time which is set forward by the delay time from the current time of the atomic clock 22, and prepares a time certificate by using this reference time (STEP 220).

Then, the auditory server 2 transmits the time certificate to the time stamp server 4 (STEP 225).

As described above, the auditory server 2 constitutes a reference time distributing server, and includes: delay time measuring means for measuring a delay time in the communication line connected to the time certifying server (time stamp server 4); reference time generating means for generating a reference time by setting forward the reference time output from the reference clock unit by the delay time thus measured, and reference time transmitting means for transmitting the reference time thus generated to the time certifying server.

Further, the auditory server 2 includes time receiving means for receiving, from the time certifying server, a time output from the clock unit installed in the time certifying server, and the delay time measuring means measures a delay time by using the difference between the time thus received and the time output from the reference time clock unit when the reception is executed.

The time stamp server 4 receives a time certificate from the auditory server 2 (STEP 230), and confirms, by using this, the time label of the internal clock 17.

As described above, the auditory server 2 prepares a time certificate while employing the time set forward by the delay time as a reference time, so that the time stamp server 4 can receive the time certificate at the reference time described in the time certificate.

Figure 12:
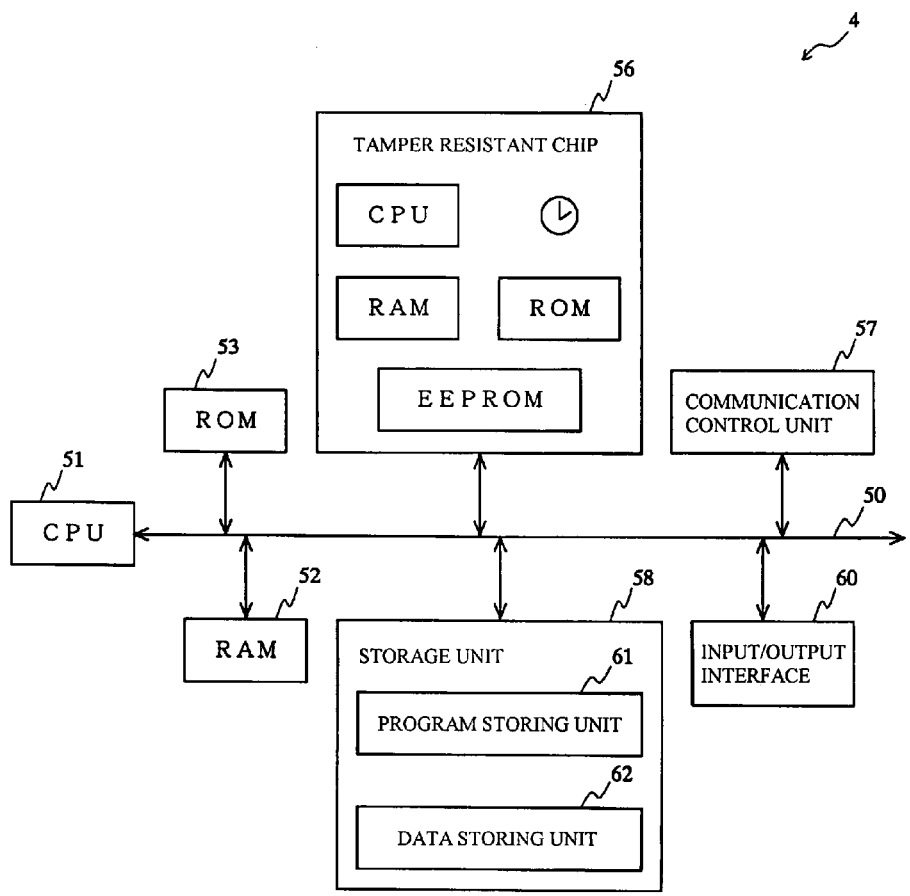
FIG. 12 is a view showing an example of hardware configuration of the time stamp server.
Figure 13:
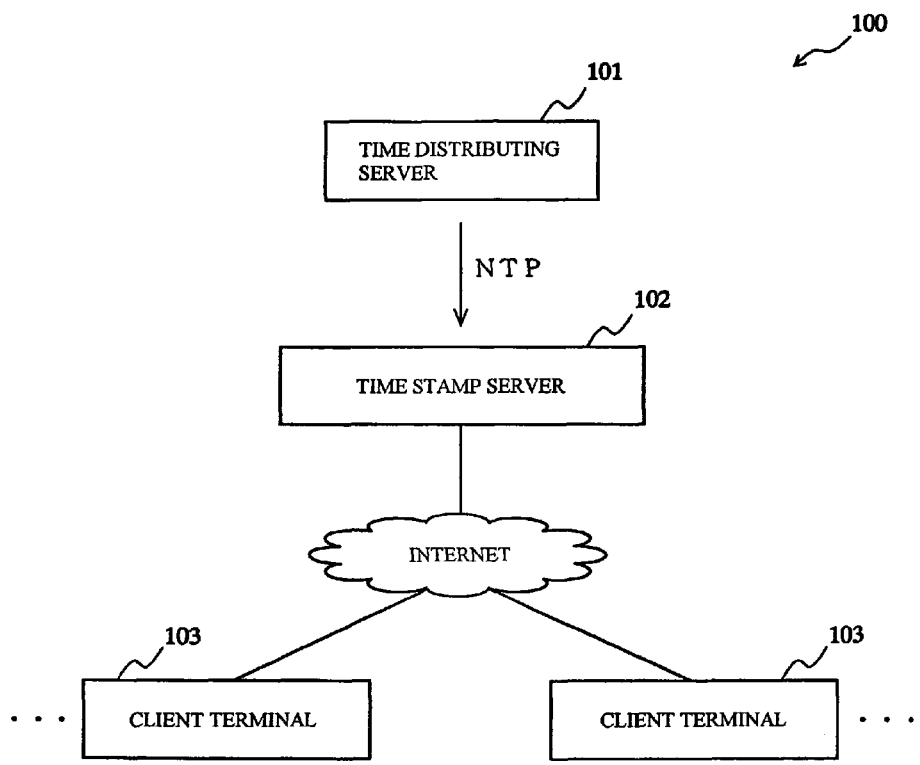
FIG. 13 is a block diagram illustrating a system configuration of a conventional time stamp system.

FIG. 12 is a view illustrating an example of a hardware configuration of the time stamp server 4.

The time stamp server 4 is constituted by function units including a CPU 51, a RAM 52, a ROM 53, a tamper resistant chip 56, a communication unit 57, a storage unit 58, an input/output I/F (interface) 60, the function units being connected to one another via a bus line 50.

The CPU 51 is a central processing unit which performs various types of arithmetic processing and information processing, and controls the respective constituent elements each constituting the time stamp server 4.

The CPU 51 performs, in cooperation with the CPU of a tamper resistant chip 56 (which constitutes the tamper resistant unit 10), information processing, obtains a time certificate from the auditory server 2, corrects the external clock 12 by using the distribution time of the time distributing server 3, or issues a time stamp in response to a request from the client terminal 5.

The ROM 53 is a read-only memory for storing a basic program, data, etc. to cause the time stamp server 4 to operate.

The RAM 52 is a readable/writable memory which provides a working area for enabling the CPU 51 to operate. The RAM 52 is so constituted as to secure areas for enabling acquisition of the time certificate, constitution of the external clock 12, and issuance of a time stamp.

The tamper resistant chip 56 is an IC chip which is so constituted as to be extremely difficult to analyze from the outside, and includes therein a CPU, an internal clock 17, a RAM, a ROM, an EEPROM, etc. A tamper resistant unit 10 is formed by performing, in the CPU, the time stamp program stored in the EEPROM. The time stamp program, an auditory public key 15, a time stamp electronic signature key 16, a previous certificate 18 are stored in, for example, the EEPROM.

The communication control unit 57 is a functional unit which connects the time stamp server 4 to the network 6. The time stamp server 4 can communicate via the communication control unit 57 with the auditory server 2, the time distributing server 3, and the client terminal 5, etc.

The storage unit 58 is a storage unit which is constituted by, for example, a hard disk, has a large capacity, and is readable/writable.

The storage unit 58 has a program storing portion 61 for storing programs, and a data storing portion 62 for storing data.

The program storing portion 61 stores various programs, including an Operating System (OS), a communication program, and so on, each of which is ready to be performed by the CPU 51.

The OS is a program which causes the CPU 51 to exhibit basic functions used for managing the time stamp server 4.

The communication program is a program which so controls the communication control unit 57 as to cause the CPU 51 to exhibit functions for communication via the network 6.

While the present embodiment is described hereinabove, the time stamp system 1 exhibits the following advantageous effects.

(1) High-precision time synchronization can be realized by correcting the internal clock 17 by the unit of second by using the distribution time distributed from the time distributing server 3.

(2) The developing and manufacturing costs of the IC chip can be reduced because an algorithm simpler than conventional ones is implemented in the tamper resistant chip.

(3) A high-precision time stamp system can be easily constituted even when an unstable network, such as the Internet, is used because the time certification and the time synchronization are separated from each other.

(4) A large-scale time stamp system including a number of time stamp servers 4 can be constituted because the auditory server 2 can perform an audit by distributing a simple time certificate.

(5) Backdating of the internal clock 17 can be prevented because the time stamp server 4 compares the time obtained in a previous audit and the reference time to be used in the audit of this occasion.

The present embodiment provides a system for providing a reliable time (time stamp system 1), the system including a master clock system (auditory server 2), a reliable local clock system (time stamp server 4) which communicates with the master clock system, and a security-protected communication with the master clock system, wherein a system for verifying through comparison accuracy of the local clock system on the basis of the time information distributed from the master clock system, and a system (time distributing server 3) for providing time information to the local clock system, the time being reliable and related to the part regarding the second hand, enable high-precision time synchronization and high-reliable time provision.

What is claimed is:
1. A time certifying server comprising:
a clock unit for outputting time information;
time acquiring means for acquiring from the time information units of time equal to or larger than a predetermined unit;
correction time acquiring means for acquiring a correction time from a correction time generating unit;
time correcting means for correcting units of time from the time information smaller than the predetermined unit using the acquired correction time and without correcting the acquired units of time equal to or larger than the predetermined unit;
reference time receiving means for receiving a reference time from a reference time distributing server that distributes reference time;
verification means for verifying that the clock unit operates at a precision falling within a predetermined range by confirming that, in the time of the units equal to or larger than the predetermined unit, the time acquired by the time acquiring means and the received reference time coincide with each other;
certification target information receiving means for receiving certification target information that serves as time certification target from a client terminal;
time certification information generating means for generating time certification information of the received certification target information after verification of the operational precision of the clock unit and using the corrected units of time; and time certification information transmitting means for transmitting the generated time certification information to the client terminal.

2. A time certifying server according to claim 1; wherein the verification means verifies that the clock unit operates at a precision falling within the predetermined range when it is confirmed that the reference time used for the verification is a time later than the time used at a previous verification.

3. A time certifying server according to claim 1; further comprising predetermined unit changing means for changing the predetermined unit.

4. A time certifying server according to claim 3; wherein the predetermined unit changing means sets the predetermined unit to a first unit; and wherein the predetermined unit changing means sets, using the first unit, the predetermined unit to a second unit smaller than the first unit when the verification means verifies a precision of the clock unit.

5. A time certifying server according to claim 1; further comprising operational mode switching means for switching between a first operational mode in which the verification means and the time certification information generating means operate and a second operational mode in which the time correction means operates; and wherein the operational mode switching means switches the operational mode after an operation is completed in each of the operational modes.

6. A time certifying server according to claim 5; wherein the first operational mode includes a verification mode in which the verification means verifies the clock unit, and a time certification information generating mode in which the time certification information generating means generates the time certification information; and wherein the operational mode switching means switches, in the switching between the verification mode and the time certification information generating mode, the operational mode to a mode switching destination after the operation in a mode switching source is completed.

7. A time certifying method executed by a computer having a clock unit for outputting time information, the method comprising:
  acquiring from the time information units of time equal to or larger than a predetermined unit;
  acquiring a correction time;
  correcting units of time from the time information smaller than the predetermined unit using the acquired correction time and without correcting the acquired units of time equal to or larger than the predetermined unit;
  receiving a reference time from a reference time distributing server that distributes reference time;
  verifying that the clock unit operates at a precision falling within a predetermined range by confirming that, in the time of the units equal to or larger than the predetermined unit, the acquired time and the received reference time coincide with each other;
  receiving certification target information that serves as time certification target from a client terminal;
  generating time certification information of the received certification target information after verification of the operational precision of the clock unit and using the corrected units of time; and
  transmitting the generated time certification information to the client terminal.

8. A time certifying method according to claim 7; further comprising setting the predetermined unit to a first unit and setting, using the first unit, the predetermined unit to a second unit smaller than the first unit when the precision of the clock unit is verified.

9. A computer readable storage medium encoded with computer program instructions, which when executed by a computer, cause the computer to:
  acquire from previously output time information units of time equal to or larger than a predetermined unit;
  acquire a correction time;
  correct units of time from the time information smaller than the predetermined unit using the acquired correction time and without correcting the acquired units of time equal to or larger than the predetermined unit;
  receive a reference time from a reference time distributing server that distributes reference time;
  verify that the clock unit operates at a precision falling within a predetermined range by confirming that, in the time of the units equal to or larger than the predetermined unit, the acquired time and the received reference time coincide with each other;
  receive certification target information that serves as time certification target from a client terminal;
  generate time certification information of the received certification target information after verification of the operational precision of the clock unit and using the corrected units of time; and
  transmit the generated time certification information to the client terminal.

* * * * *